US006996695B2

(12) United States Patent
Masse

(10) Patent No.: US 6,996,695 B2
(45) Date of Patent: Feb. 7, 2006

(54) METHOD, SYSTEM, AND STORAGE MEDIUM FOR OPTIMIZING DISK SPACE AND INFORMATION ACCESS

(76) Inventor: Wayne P. Masse, 56 Morgan St., Granby, MA (US) 01033

( * ) Notice: Subject to any disclaimer, the term of this patent is extended or adjusted under 35 U.S.C. 154(b) by 348 days.

(21) Appl. No.: 10/616,604

(22) Filed: Jul. 9, 2003

(65) Prior Publication Data
US 2004/0015672 A1   Jan. 22, 2004

Related U.S. Application Data

(60) Provisional application No. 60/396,622, filed on Jul. 17, 2002.

(51) Int. Cl.
*G06F 12/02* (2006.01)

(52) U.S. Cl. .................................. 711/173
(58) Field of Classification Search ............. 711/173, 711/112, 202, 208; 707/205
See application file for complete search history.

(56) References Cited

U.S. PATENT DOCUMENTS

| 5,129,088 A | 7/1992 | Auslander et al. ............. 711/1 |
| 5,371,885 A | 12/1994 | Letwin .................. 395/600 |
| 5,422,762 A | 6/1995 | Jerbic ...................... 360/48 |
| 5,802,599 A * | 9/1998 | Cabrera et al. ............. 711/170 |
| 6,332,182 B1 | 12/2001 | Geldman et al. ........... 711/156 |
| 6,449,689 B1 * | 9/2002 | Corcoran et al. ........... 711/113 |
| 2001/0054130 A1 | 12/2001 | Cunchon et al. ............ 711/104 |
| 2003/0163663 A1 * | 8/2003 | Aasheim et al. ............ 711/202 |

* cited by examiner

Primary Examiner—Hiep T. Nguyen
(74) Attorney, Agent, or Firm—Cantor Colburn LLP

(57) ABSTRACT

An exemplary embodiment of the invention relates to a method, system, and storage medium for optimizing disk space and information access of a computer storage system. The method comprises receiving formatting parameters for a hard partition of the computer storage system, formatting the hard partition into a plurality of soft partitions, and building system structures based upon the formatting parameters. The system structures comprise: a soft partition table and corresponding soft partition bit maps operable for specifying whether sectors on a disk are free or occupied; a sector descriptor file storing sector descriptors, whereby the sector descriptors comprise a series of encoded bytes operable for tracking physical sectors reserved for a file to hold file data; and an offset entry file operable for specifying availability of storage blocks in the sector descriptor file. The soft partition table stores information for soft partitions. Other embodiments include a system and a storage medium.

34 Claims, 12 Drawing Sheets

CATALOG/FILE/SECTOR
DESCRIPTOR
(CFSD) DMB PORTION — 702

| Offset | Field |
|---|---|
| +00 | LENGTH OF CFSD |
| +04 | CFP # |
| +08 | |
| +0C | |
| +10 | |
| +14 | |
| +18 | |
| +1C | |
| +20 | |
| +24 | |
| +28 | |
| +2C | |
| +30 | |
| +34 | |
| +38 | |
| +3C | TSD LOCATION FOR FORMATTING |

710 brace spans +08 through +38
706 points near +38
704 points to +3C row

FIG. 7

SECTOR DESCRIPTOR DATA STREAM
FLOPPY DRIVE

METHOD, SYSTEM, AND STORAGE MEDIUM FOR OPTIMIZING DISK SPACE AND INFORMATION ACCESS

CROSS-REFERENCE TO RELATED APPLICATIONS

This application claims the benefit of U.S. provisional application Ser. No. 60/396,622, filed Jul. 17, 2002, the entire contents of which are incorporated herein by reference.

BACKGROUND

The present invention relates to file management systems for computer storage subsystems, and more particularly, to a method, system, and storage medium for optimizing disk space and information access.

File systems define the organization of files stored on the peripheral devices associated with a computer system. Accordingly, in order for the computer system to read or write data that can be understood by the computer system and its peripheral devices, the data must be organized consistent with the file system. File systems facilitate communication between the operating system and device dependent drivers and are responsible for converting read and write commands generated by an operating system (as well as functions such as opening and closing files), into a form recognizable by the device driver.

One well-known file system is the file allocation table (FAT) file system. The FAT points to clusters of sectors on a disk that hold a file's data. A FAT entry can be 12, 16, 20, 24, or 32 bits long, depending on how the disk's sectors are organized into clusters, and how large the drive is. Unfortunately, as drives grow bigger, so does the size of the FAT. One way to prevent the FAT from becoming too large is to group more sectors into each cluster to allow for fewer entries in the FAT. For example, an 8 GB drive whose cluster size is 16 sectors, would need 1,048,576 entries in its FAT (i.e., 8GB/(16*512), where a sector has 512 bytes). Utilizing an algorithm to squeeze 1,048,576 entries into a 20-bit FAT would mean the FAT would have to be 2,621,440 bytes long. If a 24-bit FAT was to be used for the 8 GB drive it would require 3,145,728 bytes. Each cluster is accessed by the preceding cluster entry for the file. In other words, if a file is 1 MB long, it would need to point to 128 entries (of 16 sectors) in the table, which would require 192 bytes for a 12-bit FAT, or 256 bytes for a 16-bit FAT.

One disadvantage in increasing the size of the clusters is the potential for wasted space. For example, consider a cluster size of 16 sectors. If a file needs only 4,000 bytes, then 4,192 bytes would be wasted in that cluster (16 sectors=8,192 bytes–4,000 bytes used=4,192 remaining bytes).

Another type of file system utilizes run length encoding. This system provides bit maps for marking free/used sectors in which a set number of sectors is assigned to each bit throughout the whole map. Each bit typically represents one sector, which means a map built for a large capacity disk would need to be correspondingly large. If, on the other hand, the bits represent more than one sector, there is again the potential for wasted space. The run length encoding has set 4-byte 'start' and 'tail' indicators. The 'start' indicator refers to the number of the starting sector and the 'tail' indicator refers to the number of the end sector. If contiguous sectors can be found and a file has to be appended, the needed sectors are added to the tail. If they are not contiguous, a new 8-byte start/tail combination has to be written. While the latter can save space by accessing fewer fixed number sectors (usually 1), and appending sectors as needed, 8 bytes are still required in a run. In addition, the structures needed to manage these runs require one sector per file. If the runs are too large to fit into the first sector, an entire new sector must be saved to store additional information. These structures, although capable of growing and shrinking, still have a set of assigned characteristics to them. Files accessing this file system, whether large or small, are all dealt with in the same manner, i.e., the file has no control over its sector allocation.

What is needed is a way to optimize disk space and information access to accommodate variable sized files and storage subsystems.

SUMMARY

An exemplary embodiment of the invention relates to a method, system, and storage medium for optimizing disk space and information access of a computer storage system. The method comprises receiving formatting parameters for a hard partition of the computer storage system, formatting the hard partition into a plurality of soft partitions, and building system structures based upon the formatting parameters. The system structures comprise: a soft partition table and corresponding soft partition bit maps operable for specifying whether sectors on a disk are free or occupied; a sector descriptor file storing sector descriptors, whereby the sector descriptors comprise a series of encoded bytes operable for tracking physical sectors reserved for a file to hold file data; and an offset entry file operable for specifying availability of storage blocks in the sector descriptor file. The soft partition table stores information for soft partitions. Other embodiments include a system and a storage medium.

BRIEF DESCRIPTION OF THE DRAWINGS

Referring to the drawings wherein like elements are numbered alike in the several figures:

FIG. 7 is a data management block used by the tool in managing file storage;

DETAILED DESCRIPTION

The disk management utility may be implemented as an internal component of a computer operating system or may be a separate disk management utility independent of the operating system software. The disk management utility allows a user, preferably a programmer or technical person, to customize initialization procedures for a computer disk storage subsystem via a user interface provided by the tool. The tool queries a user to provide formatting parameters which it then uses to build system structures for managing user files and data, as well as for managing the user-selected formatting specifications. The tool optimizes disk space and information access utilizing the system structures. The two major components of the disk management utility include the initialization component and the file allocation component.

Initialization Component

Figure 1:
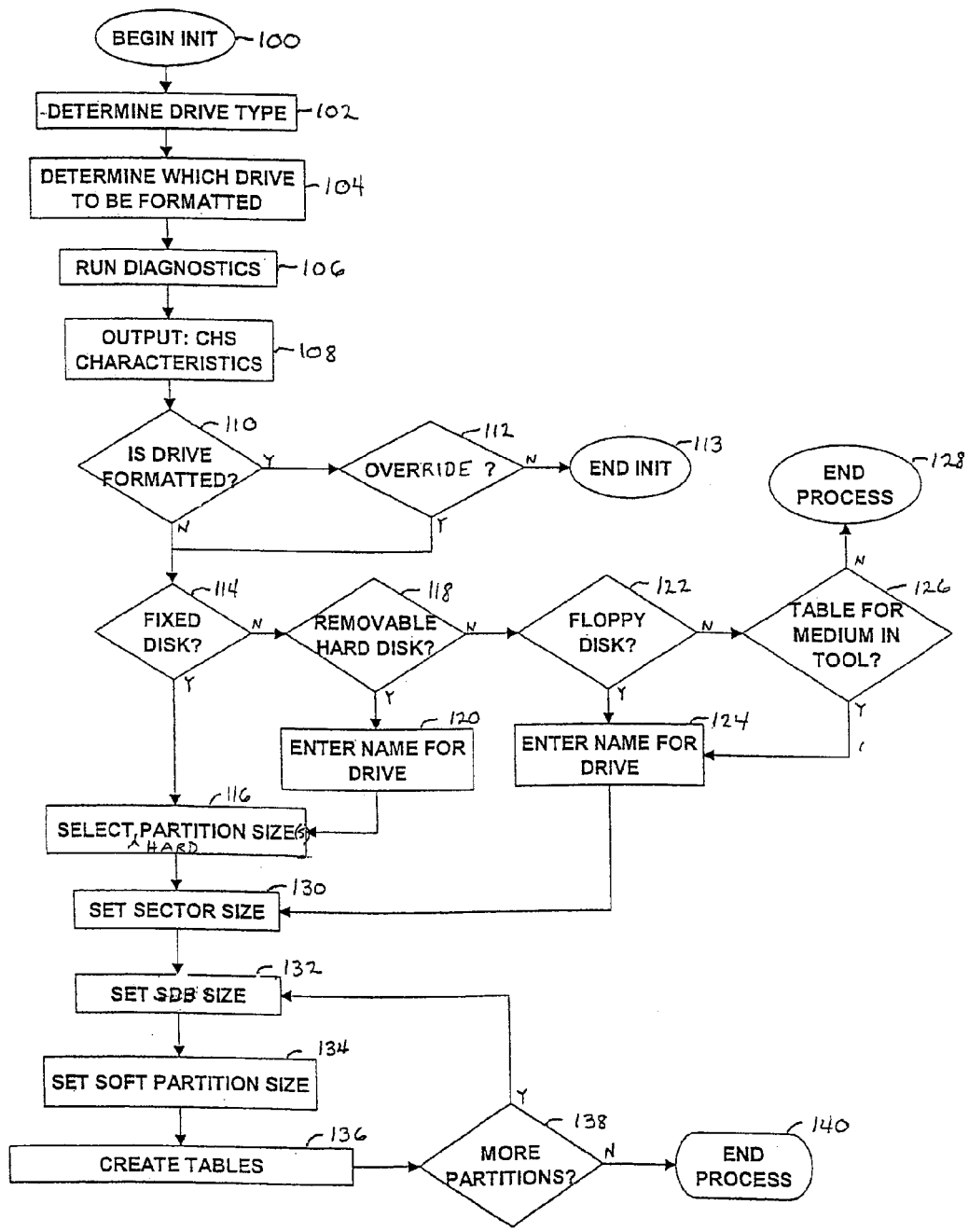
FIG. 1 is a flowchart illustrating how the disk management utility performs customized formatting of system requirements for a computer storage subsystem in an exemplary embodiment.

The process of initializing a disk is described in FIG. 1. A user implementing the disk management utility (also referred to as "disk management tool" or "tool") is guided through a process in which customized formatting of system requirements for a computer storage subsystem via the tool's user interface is performed as described herein. The term 'formatting', as used throughout this description, indicates the formatting of the system structures used by the tool and is not to be confused with the physical formatting of a drive. Once execution of the initialization phase has begun at step 100, the tool checks the drive type for the disk it is formatting at step 102. Drive types such as floppy drives or hard drives can be formatted utilizing existing driver software. A CD-ROM or other mass storage device could also be formatted if the appropriate driver with the proper tables were installed. The disk management tool determines which physical drive is being formatted (e.g., a computer system equipped with multiple disk drives of the same type) at step 104. A diagnostic test is performed in order to test the characteristics of the drive at step 106. Testing occurs through the computer system's BIOS, and/or the tool's software. The results of the testing indicate the size of the drive and the cylinder/track/head (CHS) characteristics including the number of sectors per track at step 108. These results are stored in a disk descriptor table (DDT) which is shown and described in FIG. 12.

One of two options is possible depending upon the results of the testing. If the drive has already been formatted for the tool at step 110, the user has the option of overriding the current format settings, which results in the destruction of any existing data at step 112, or amending the format such that only the unused portions of the drive are re-formatted. In either event, the process continues at step 114. If the drive has been formatted and the user does not wish to override the settings, the initialization phase ends at step 113. If the drive has not been formatted for the tool at step 110 and the disk being initialized is a fixed hard disk drive at step 114, the user is prompted to select a size for each desired hard partition expressed as a percentage of the total hard drive space (1–100%) at step 116 and the process continues at step 130. For illustrative purposes, the first partition size selected is 10%. A hard partition refers to a portion of a hard disk that is treated by a computer system as if it were a separate disk drive. Hard partitioning is an option provided by operating systems such as DOS™, Microsoft Windows™, and IBM's OS/2™ utilizing an FDISK command to set the partition structure of a hard disk. Hard partitioning is commonly known and will be appreciated by those skilled in the art. The user is queued by the tool to continue entering hard partition sizes until 100% of the drive is accounted for. The tool stores these selections, processing one selected partition at a time as described in steps 132–136 below. If the drive has not been formatted for the tool at step 110 and the disk being initialized is a removable hard disk at step 118, the user is prompted to enter a name for the drive at step 120 followed by selecting one or more partition sizes at step 116 as described above. If the drive has not been formatted for the tool at step 110 and the disk being initialized is a floppy disk at step 122, the user is prompted to enter a name for the drive at step 124 and the initialization process continues at step 130. The name is requested by the tool in order to allow the operating system to identify and track the disk and any subsequent modifications made to its files. Finally, if the drive has not been formatted for the tool at step 110 and the disk being formatted is neither a removable hard disk nor a floppy disk, the tool checks to see if a table exists that can accommodate the medium detected at step 126. If no table exists, the process ends at step 128. Otherwise, the user is prompted to enter a name for the medium at step 124 and the process flow proceeds to step 130.

In step 130, the tool sets the sector size for each sector on the disk at 512 bytes as this is the size commonly used in most modern disk drives. In a preferred embodiment, this sector size selection option is not queued in through the user interface of the disk management tool as it is intended that only experienced programmers alter this information. The tool then sets the sector descriptor storage block (SDB) size at step 132. Sector descriptor storage blocks are described further in FIG. 4. In step 134, the tool sets the soft partition size at 16 MB, although this size can be modified by a user if desired. As with the sector size described above, this option is preferably not queued in through the tool's user interface. Soft partitions are described further in FIGS. 2 and 3.

In step 136, the tool creates three tables for the first selected partition based on the information acquired in steps 100–134, namely, a soft partition table, a sector descriptor file, and an offset entry file. These tables are described further herein. The tool checks to see if additional partitions have been selected by the user at step 138. These additional partitions refer to those which were selected and stored in memory as described above in step 116. If additional partitions are found, the process recited in steps 132–136 is repeated until all partitions have been addressed and the initialization process ends at step 140.

The first table created, the soft partition table (SPT), is used for specifying which sectors on a disk are free and which sectors are occupied. For large capacity storage subsystems, bit maps are generally used for tracking sector availability. Bit maps are used extensively in computers to show set and reset conditions. These are used in character generators to show which pixels are to be displayed in memory systems to determine which blocks of memory are utilized and which are not, and are also used in communications with chip sets to determine which functions should be turned on and off.

For example, a 3.5 inch, 2-sided, high-density drive holding 1.4 MB of data would have 2,880 sectors and a corresponding bit map would require 2,880 bits; that is, one bit corresponding to each sector. For a typical 8 GB hard drive, this number of sectors (and bits) could equal 16,514,064. Since there are 8 bits in a byte, a bit map for the above-referenced drives would need 360 bytes and 2,064,258 bytes, respectively. This bit map system may work fine for a floppy drive, but is not efficient for larger storage subsystems such as a hard drive. One can see that as the size of a hard drive grows, so must the bit maps.

Figure 2:
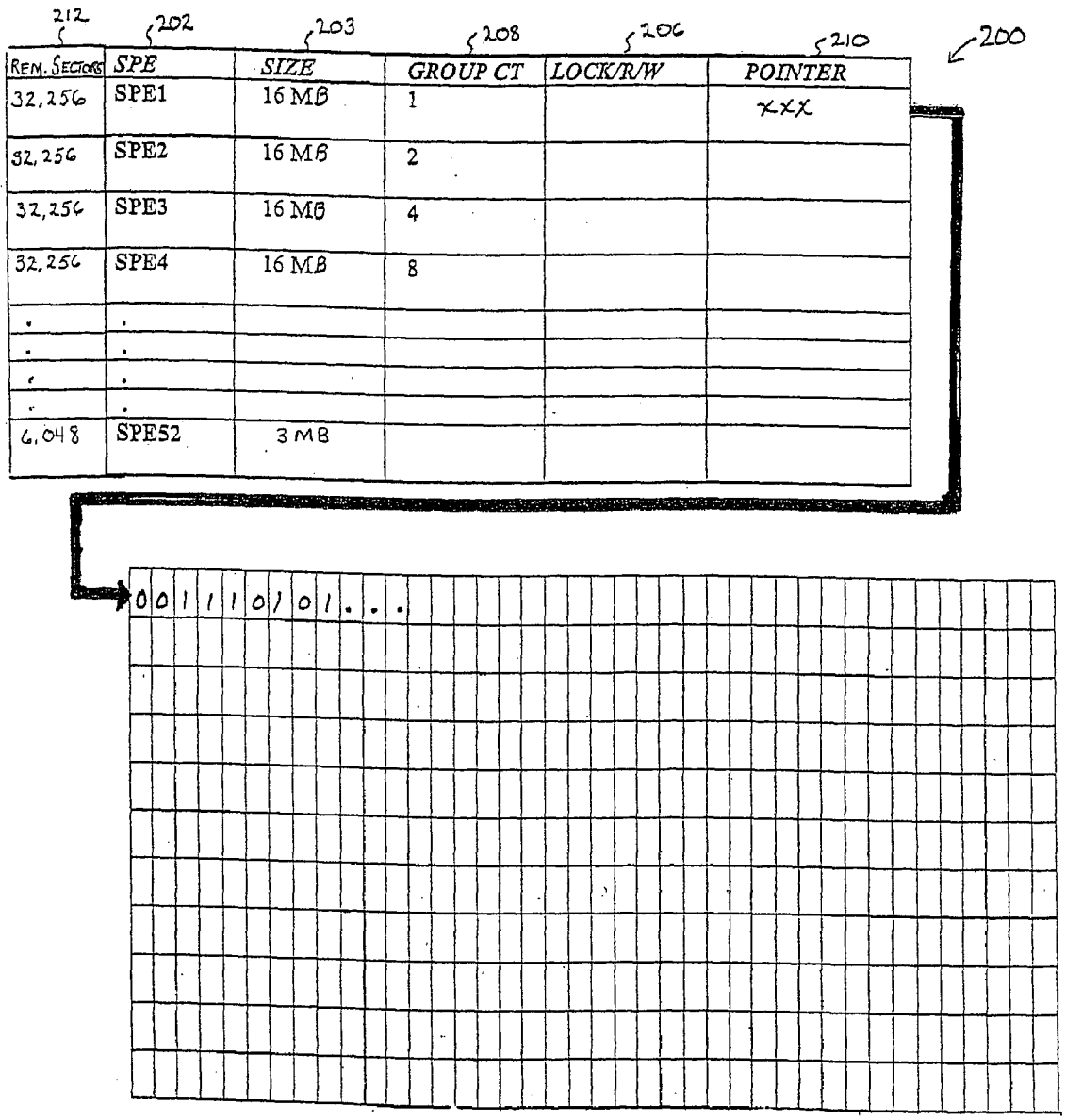
FIG. 2 is a soft partition table and corresponding soft partition bit map utilized by the disk management tool.

The disk management tool utilizes a soft partition table to overcome the deficiencies described above. A soft partition table and corresponding soft partition bit map (SPBM) 220 is illustrated in FIG. 2. SPT 200 is designed by using an algorithm to determine the number of sectors on the drive as well as the number of soft partition entries (SPEs) needed.

Figure 3:
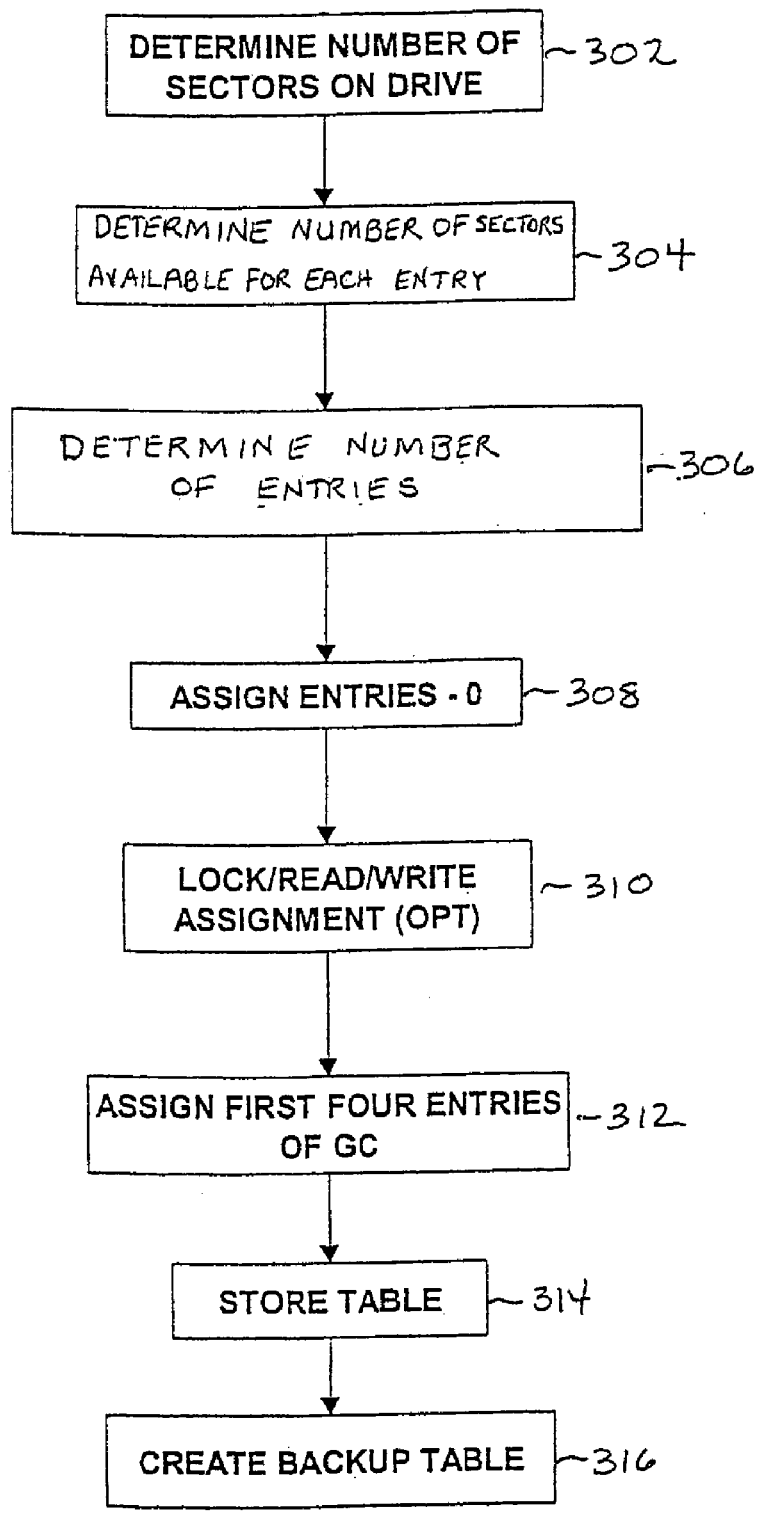
FIG. 3 is a flowchart illustrating the process of creating a soft partition table.

FIG. 3 describes the process of creating a soft partition table. The disk management tool determines the number of sectors on the drive at step 302. This information may be taken from step 108 of FIG. 1. It then considers these sectors as a continuous run of sectors from 1 to n, where n is the total number of sectors. For example, a 10% hard partition size has been selected for an 8 GB drive with cylinder/head/sector (C/H/S) characteristics of 16,383; 16; and 63, respectively. The total number of sectors for the drive would be 16,514,064 (16,383*16*63).

The drive's head and sector characteristics derived from FIG. 1 at step 108 are used by the tool in computing a Mod(H/S) value which functions to round down the results of calculations to an even multiple of head/sector units as described in steps 304 and 306 below. Utilizing the sample values provided in FIG. 1, the Mod(H/S) equals 1,008 (16*63=1,008). At step 304, the tool computes the actual number of sectors needed for each soft partition entry (see 'size' column 203 of FIG. 2) using the sector size selected in step 130 of FIG. 1. The soft partition size selected in step 134 (e.g., 16 MB) is then divided by the sector size (e.g., 512 bytes) resulting in 32,768 sectors. Rounding this number utilizing Mod(H/S) results in 32,256 sectors. This number indicates the maximum number of sectors available to each soft partition entry and is also used as the starting value that is stored in 'remaining sectors' column 212 of FIG. 2. At step 306, the tool then uses this figure (e.g., 32,256) to compute the number of soft partition entries required for the drive/partition size which was derived from steps 108/116 of FIG. 1. Using the 10% hard partition example above, the amount of sectors for the partition would be 1,651,406 (.10*16,514,064). This number of sectors is then divided by the entry size of 32,256 from above to get the number of entries (1,651,406/32,256=51.197). Soft partition entries 1–51 of FIG. 2 would be 32,256 sectors in size and the soft partition entry 52 would be 6,354 (32,256*.197=6,354). The Mod(H/S) value of 6,354 would equal 6,048 which reflects the value entered in column 212 for entry SPE52 (i.e., multiplying 6,048 sectors by the sector size of 512 bytes results in 3 MB). Any extraneous sectors of the last entry SPE52, if any, are not lost. They may be added to subsequent partitions to be used as needed. In this case, the number of extraneous sectors equals 306 (6,354–6,048). Two conditions become apparent from the above-recited steps. First, the actual percentage desired for a partition becomes rounded to the Mod(H/S) characteristics. In the example illustrated above, 1,651,104 sectors are available for the selected partition which accounts for 9.998% of the total partition space. This is well within acceptable tolerances. Second, by conforming every soft partition entry in every partition to the Mod(H/S) value, 100% of the available drive sectors can be accounted for.

The tool initially assigns each group count entry (column 208 of FIG. 2) as 'null' which means it has not yet been assigned at step 308. An assigned group count entry will be described further herein.

Lock/R/W column 206 contains optional information that allows a user to selectively lock or read/write-protect the entry at step 310.

Each pointer column 210 entry contains the starting location of the associated SPE soft partition bit map (SPBM) 220.

Group counts (GCs) of various sizes are established by the tool. Instead of each bit of a bit map corresponding to one sector as in prior art systems, each entry in SPE column 202 is assigned a group count (as shown in column 208), and each bit in the corresponding SPBM then refers to 1 group count. A group count is a flexible multiple of 2 (beginning at 1 and extending up to 128) that can be assigned to an entry. The group count indicates the number of contiguous sectors that each bit represents. For instance, a GC of 2 indicates that each group in the entry contains 2 sectors as illustrated in SPE2. Although group counts of up to 128 can be used, it is preferred that the maximum group count not exceed 16.

The tool assigns group counts to the first four entries of an SPT if available (e.g., if a drive is smaller than 64 MB, it may not have 4 entries) at step 312. The first four entries are assigned the values 1, 2, 4, and 8 respectively. This is to allow the tool to begin using the drive. Remaining entries are assigned GCs only as they are needed and, therefore, create the maximum amount of flexibility in utilizing disk space. If an entry becomes free, i.e., all of its bits in the bit map are 0, the entry is marked 'unassigned', and can be reassigned a new GC as needed. The soft partition table 200 is stored on the drive at step 314 and a backup copy is made at step 316 to help detect errors.

The tool will also set any group bit in SPBM 220 as required if a sector is bad in a group. This will prevent programs from trying to store data in a defective group. The bits in a bit map are set only when a file's data is placed in the corresponding group of sectors for an entry. The bits will then be cleared if the file is deleted so the group can be used again. When a bit is set by the tool to indicate a defect, there is no file that points to it, so deleting any files from the entry will not affect the set defective bit.

SPBMs for a soft partition table entry are stored using only enough sectors as required to hold them. The larger a group count is for an SPE, the smaller the space required to hold its SPBM, as fewer bits are needed to represent the sectors in the SPE.

The tool preferably stores the soft partition tables in random locations on the drive. By not assigning permanent locations, it lessens the possibility of viruses searching out and attacking the tables as they are more difficult to find.

Figure 4:
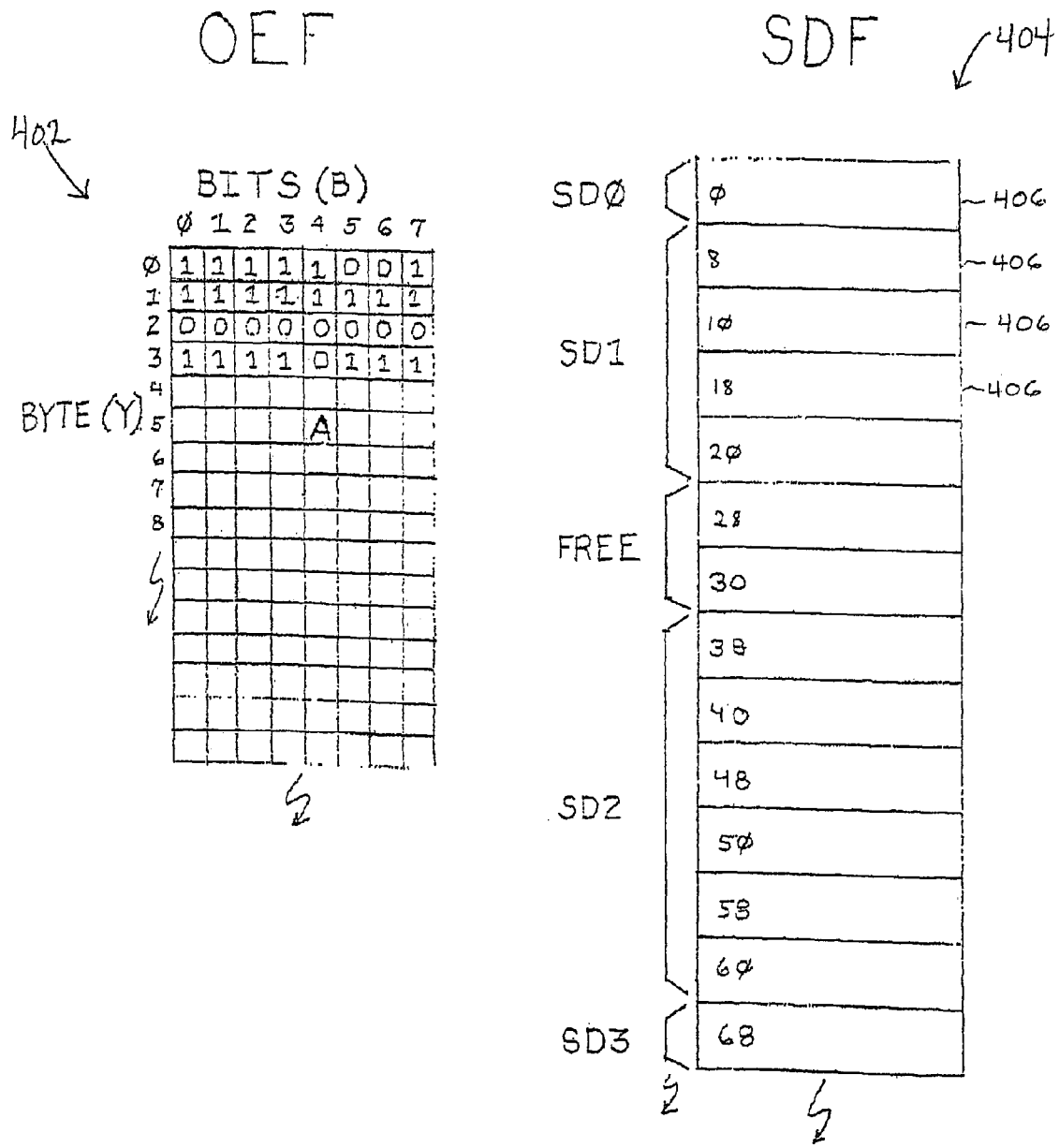
FIG. 4 illustrates a sample offset entry file and corresponding sector descriptor file used by the disk management utility in formatting a disk.
Figure 8:
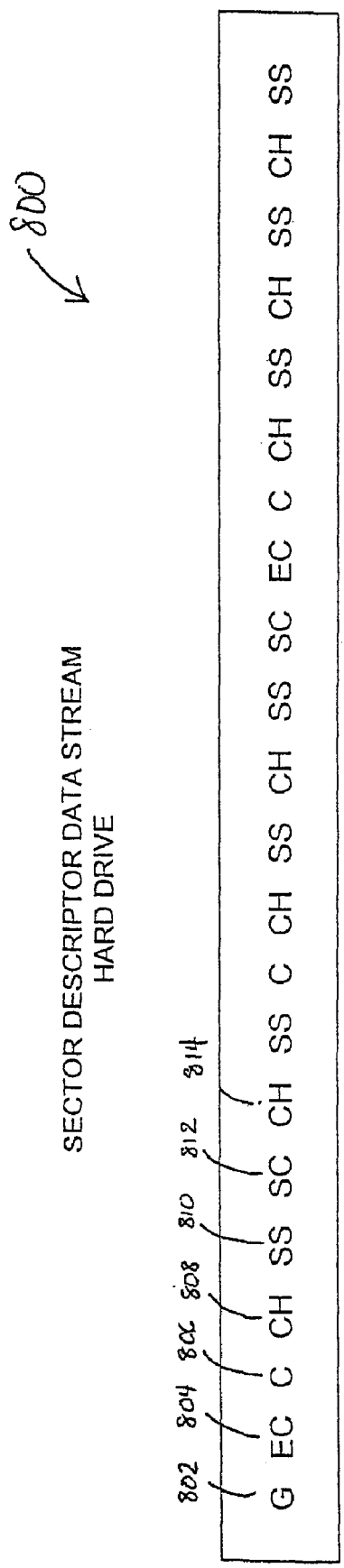
FIG. 8 is a block diagram of a sample sector descriptor data stream for a hard disk that is utilized by the disk management utility in an exemplary embodiment.
Figure 9:
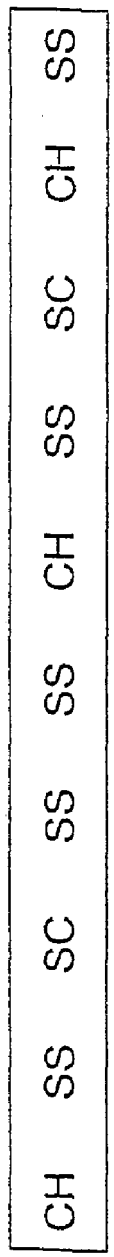
FIG. 9 is a block diagram of a sample sector descriptor data stream for a floppy disk that is utilized by the disk management utility in an exemplary embodiment.

The two additional tables built by the tool, the offset entry file (OEF) and the sector descriptor file (SDF), are both illustrated in FIG. 4. A sector descriptor (SD) is a series of encoded bytes that keep track of the physical sectors reserved for a file to hold its data. The SD is coded in such a way that contiguous or non-contiguous sectors, and even sectors across soft partition boundaries, can be coded into the least amount of space as possible to avoid recording redundant information. A sample SD for a hard disk drive is illustrated in FIG. 8 and a sample SD for a floppy disk drive is illustrated in FIG. 9. Sector descriptor information is stored in SDF 404 and described in more detail further herein.

OEF 402 is a bit map containing information regarding the availability of storage blocks in SDF 404. A storage block 406 is a unit of pre-defined length, usually 16 or 32 bytes long, which resides in SDF 404. A file's SD is stored in one or more storage blocks 406 in SDF 404. The length of SDF 404 can therefore be determined by multiplying the size of each storage block 406 by the number of storage blocks in SDF 404. The size of each block 406 is set during initialization (see FIG. 1 at step 132), whereas the number of blocks can fluctuate depending upon need. The block size can be either a default value, or a value set by the user. Each bit in OEF 402 corresponds to one block 406. Smaller SDs are preferably stored in a file descriptor block (FDB) as described in FIG. 5 rather than an SDF to allow for quicker access of the SDs. SDF 404 stores the sector descriptors for files when they are too large to fit into a file descriptor block.

A file's sector descriptor will occupy as many storage blocks as necessary. By keeping the size of the storage block small, valuable storage space can be saved, particularly in situations where smaller SDs frequently occur. The size of storage blocks in the SDF can be 8, 16, 32, 64, or any multiple of 2 thereafter.

Illustrated in SDF 404 of FIG. 4 are 4 SDs stored in SDF 404; namely, SD0, SD1, SD2, and SD3. SD0 and SD3 each occupy 1 storage block, SD1 occupies 4 storage blocks, and SD2 occupies 6 storage blocks. It will be understood that these numbers are for reference only and are not intended to signify that file SDs have to be sequential based upon the time in which the file's SD is stored. For example, SD0 could have originally been utilized for a file that has been since deleted, and a subsequent file (e.g., the $121^{st}$ file saved), could now occupy this space.

Two storage blocks in SDF 404 are marked "free". If the next file to be stored has an SD that requires one or two blocks, it can occupy these one or two free blocks as required. If there are not enough free blocks found for an SD within the length of the current SDF, the SD is simply added to the end of the SDF. The SDF and the corresponding OEF may expand as necessary to hold the extra length required. Both the OEF and the SDF are expanded or reduced in size by a set length as required in order to avoid becoming overly fragmented.

If a file's SD is subsequently deleted, its storage blocks can be used by other files. For example, if SD2 was removed its 6 blocks would become free for use. If the two blocks prior to these are still free (i.e., the ones currently marked "free"), there would be eight contiguous blocks available to other files. A file that requires one to eight blocks for its SD could put it here, or any combination of files requiring eight blocks or less could put their SDs in the appropriate blocks.

Turning now to OEF 402, each bit corresponds to the current "occupied/free" storage blocks of SDF 404. Referring to OEF's 402 grid, entry Y0, B0 indicates the bit for the first storage block of SDF 404 and is marked "occupied" as referenced by placing a '1' in the bit entry. The two bits marked Y0, B5 and Y0, B6, are marked "free" (as reflected by setting the bit to '0') and their corresponding storage blocks in SDF 404 are labeled "free". It will be understood that the axes of the grid referred to above are labeled 'Y' and 'B' for purposes of illustration only and are not intended to be limiting in scope.

To find the beginning of an entry, or its "offset" into SDF 404 using the example of FIG. 4, the Y location of the bit is multiplied by eight, followed by adding the location of B. This is the number of the entry that would be returned to the calling file to let it know where its SD is located in the SDF. It would also be used to find the offset of the first bit in the OEF if the bits had to be cleared subsequent to a change in its SD.

Once the offset number is known, the physical offset into SDF 404 can be determined by multiplying the offset number by the size of each storage block 406. Keeping each block size a multiple of two makes this multiplication quick by simply having to shift the offset number by the amount needed. For instance, if each block were eight bytes long, the number is shifted to the left three places. This, in effect, multiplies the number by eight.

For example, to find the location of SD3, one would refer to the numbers inside SDF 404 storage blocks marked 0, 8, 10, etc. These are hexadecimal numbers. The file that points to this would have an entry number of 0Dh (i.e., count the blocks starting at 0 for the first block). This number is shifted by three resulting in 68h, which is the actual offset. These particular numbers are simplified for demonstration purposes only and do not necessarily reflect the actual numbers used in the system.

What becomes clear is that the OEF and SDF file system lends itself to very compact storage of vital sector allocation information for a file. Further, it lends itself to easy and quick access to the information. By having both files based on two for storage information, and knowing the size of storage units for these files themselves, (e.g., 512 bytes for a drive sector), both entries in the OEF and the SDF can be referenced to their location in the storage unit also. Therefore, only that part of the OEF or the SDF that contains the information for the required SD needs to be accessed.

If the information for the OEF and the SDF are cached in memory, only those portions on the storage medium where the information lies needs to be accessed if information is changed. The disk management utility is capable of keeping track of very large OEFs and SDFs if required. However, in a preferred embodiment, these files are kept in as small a storage area as possible.

The tool routinely scans the OEF for large numbers of free entries. If found, it will look for files with SDs that can be moved from the end of the SDF into these free entries. In this manner, the tool effectively 'deletes' empty entries and reduces the size of the OEF and SDF files. This process is done transparent to the user.

It will be understood that only external sector descriptors such as the larger SDs described above, are preferably held in the OEF and SDF files. External SDs are those that cannot fit into a file's file descriptor block (FDB) 502. A file descriptor block is described further in FIG. 5.

Once the above structures are in place, the newly-formatted substorage system has what it needs to store and fetch information.

File Allocation

Figure 5:
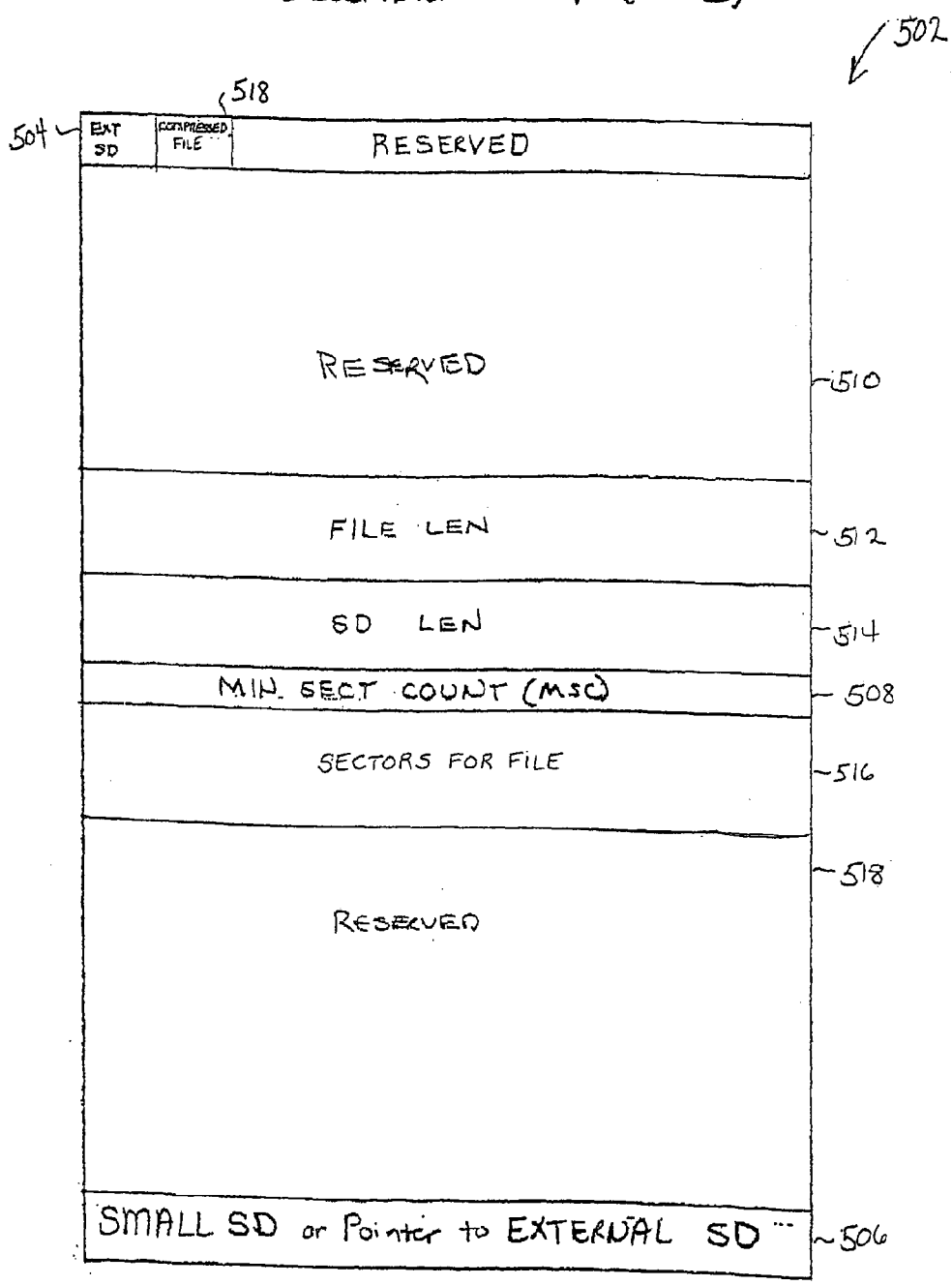
FIG. 5 is a file descriptor block of a user file.

Sector allocations for a file, and conditions for sector allocation, may be set by a user on an individual basis via the disk management utility. The disk management tool, or the programmer, can assign a desired minimum sector count (MSC) to a file. The MSC refers to a minimum number of contiguous sectors that can be allocated to a file. An MSC of 2, for example, indicates that there has to be at least 2 contiguous sectors available in a group count of an SPE before file allocation is permitted. The tool computes the MSC using an algorithm that reads the size and type of file, sets the MSC accordingly, and stores the MSC in the file descriptor block (FIG. 5, 508). Once set, this MSC stays with the file. Any time a file's length is substantially altered, however, the disk management tool may assign a new MSC based on what it determines would be a better number to store the file more efficiently. This is described further in FIG. 10. A user has the option of selecting an MSC for a data file or may allow the tool to determine an optimum value for the MSC. Conversely, a user-selected MSC is not an option for a program file as it is automatically determined by the tool.

In reexamining a file's size, the disk management tool also checks to see if any bits in the SPBM have been freed up that might make the SD more compact, thereby defragmenting a file on a dynamic basis, even if the MSC doesn't change.

Utilizing an MSC has another advantage. The disk management tool is preferably configured to look for SPEs that have a matching group count (GC) before searching SPEs with non-matching GCs. Therefore, multiple files that have a specified MSC can reside in similar SPEs, thus, saving space by not using space in entries that have dissimilar GCs. For example, a large file that has an MSC of 16 would preferably reside in an SPE whose GC was also 16, while a small file with an MSC of 1 would reside in an SPE whose GC was also 1. This helps keep files from defragmenting across varying lengths.

A third benefit is saving disk space. A small file of 348 bytes would reside in an SPE with a GC of 1 if possible, thereby not wasting any unneeded sectors. Efficiency is maintained for large files in that more sectors can be selected to be grouped together in order to make access quicker. It will be understood, however, that while grouping these files with shared GCs is preferred, there is no restriction that prevents the tool from putting a file in an SPE that has a GC different from its MSC. This may happen where all the SPEs were assigned a GC, and all the SPEs with the desired MSC were full. The tool would simply look in all the other SPEs, starting with the next smallest (if applicable) and work up. This is done in this way to ensure the highest level of space efficiency. If there are unassigned entries left in the soft partition table, however, the tool simply assigns it the required GC to match the MSC, but preferably not a GC over 16.

The file descriptor block component of the invention will now be described. Files are held in blocks of 64 bytes. A directory, or catalog, is typically a group of sectors combined that holds important file information for individual files, such as its name, length, date of inception, type, etc. Each file is considered an entry in the catalog or directory, and each entry comprises a specified number of bytes in the catalog. These bytes are referred to as a file descriptor block. DOS systems utilize 32 bytes per entry, or block. The tool utilizes 64 bytes because of the amount of information contained in an entry, or block. More information is held in an FDB than could be put into a 32 byte block. This extra usage is outweighed by the savings of memory in other aspects of its function. In prior art utilities (e.g., run length encoding), each file needed an extra 512 bytes (1 sector). Each file has a name that can be from 1 to 255 characters long. The tool handles long file names by appending blocks as needed. Each file also has a file type declaration. For purposes of illustration, they are grouped into three categories: catalogs (directories), system files, and user files. Catalogs are entries that hold other catalog files, system files, and user files. System files are used by a computer system and are generally unalterable by a user (e.g., program files). User files are any files that the user has complete access to unless he decides otherwise.

A bit 504 in the FDB determines if the SD is internal or external, and an SD can be switched between internal and external if and when modified, as its length changes accordingly. The internal SD is stored in a designated location 506 in FDB 502. Block 518 is reserved.

In the FDB there is also the MSC byte block 508 which stores the MSC as described above, the file's actual length in bytes 512, the number of sectors reserved for the file 516, and length 514 and location 506 of its SD. Without the SD, the file would not be able to access its data. The length of the SD is determined when the sectors for it are allocated. This is important because when a file is loaded into the CFP/CFSD (see generally FIG. 6), its SD must also be loaded if necessary. Only the SDs for active files are retained in the CFP/CFSD. Not all SDs have to be loaded in. File's that have small SDs store their SDs within their FDB. A bit 504 in the FDB determines the SD's location, whether internal or external. If internal, the last bytes 506 in the FDB 502 are the SD. This obviously saves space in the SDF. If the SD is external, the last bytes 506 in FDB 502 point to a location in the OEF which, in turn, points to the SD location in the SDF. Blocks 510 and 518 are reserved.

Figure 6:
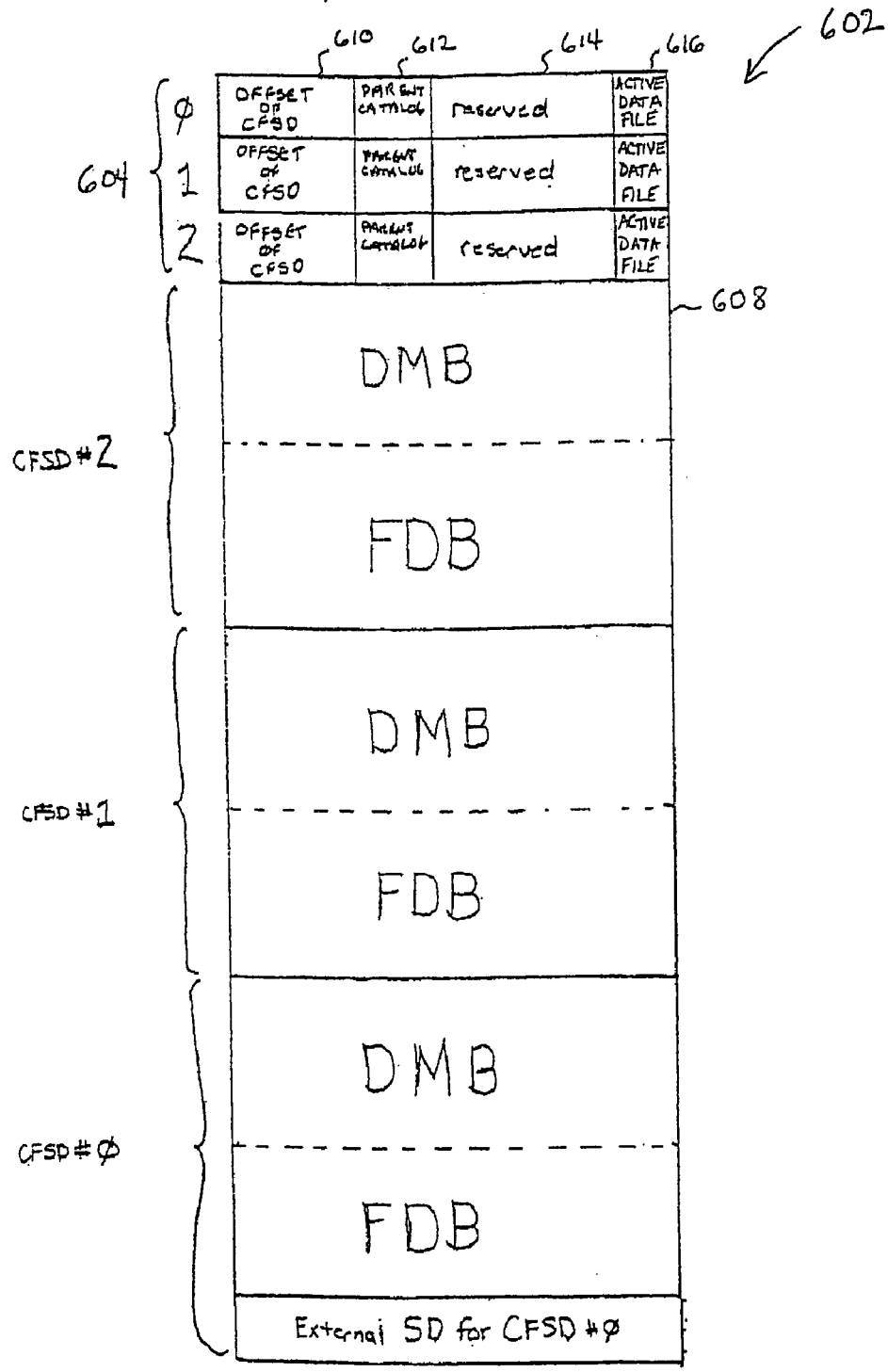
FIG. 6 illustrates a sample catalog/file pointer table and catalog/file/sector descriptor table utilized by the disk management utility in performing sector allocation activities.

The tool provides a file access feature where entire groups of entries need not be resident in memory in order to access their sectors. Referring to FIG. 6, when the disk management tool is activated, it builds two structures in the computer system's memory: a disk descriptor table (see generally FIG. 12) and a catalog file pointer table/catalog file sector descriptor table (CFP/CFSD). CFP/CFSD table 602 is actually one table divided into two parts.

Any time a file needs to be accessed, the tool must know which drive, and which catalog, to look into. It can do a complete search of the specified drive if necessary. As catalogs or files are accessed, their FDBs are loaded into CFSD 602. A CFP number 604 is assigned to each file and this number is returned to the user or user files in order to later access the file. For catalog files, the CFP number is assigned to any subsequent catalogs or files as described further herein. Numbers are used for access to a file as they are far quicker for the system to use than having to search for a file's name each time the system needs to access it. The CFP points to a block of 16 bytes in the CFP table 602. Block 610 points to the offset in memory where the file's FDB and DMB reside. Block 612 represents the catalog CFP number in which the file resides on the storage medium (disk drive, etc). This is referred to as its parent catalog. Blocks 614 and 616 are reserved for other file management functions. When the file is loaded, an additional 64 bytes are reserved for the file which are used as the file's control area for accessing its sectors. These 64 bytes are reserved for DMB 608 which is described in detail in FIG. 7.

The data management block (DMB) 702 of FIG. 7 will now be described. DMB 702 ensures the integrity of its corresponding FDB and manages files utilizing information held in the FDB. The DMB holds a temporary sector descriptor (TSD) and other variables the file needs as shown generally in FIG. 7. Blocks 704 and 706 are described further in FIG. 11. Block 710 is reserved.

As long as files are open for a particular catalog, the catalog remains in memory. This is true even of floppy files whose disk has been changed. This gives the user a chance to re-insert the disk to save important information when it is realized that open files for the disk are still resident in memory. This is the importance of naming a disk. Each CFP 602 of a catalog is attached to the catalog(s) or user file(s) 612 that rely on its path. In this way, if the file is amended in any way, the catalog(s) can be updated immediately as needed also. In addition, if one file is accessed from a catalog, chances are other files may have to be accessed from the same catalog. Catalog SDs are built the same way as other files' SDs. Data files that are continually being read and/or written to are also retained in CFP/CFSD 602.

Once loaded, program files' SDs usually don't have to be accessed at the disk level anymore and are removed, unless they reside in virtual memory where only portions of the files are held in system memory at a time, and it is important to have fast access to its data.

Referring now to FIGS. 8 and 9, a sample sector descriptor data stream for a hard drive (FIG. 8) and a sector descriptor data stream for a floppy drive (FIG. 9), respectively are shown. The SD bytes stored in the data streams of FIGS. 8 and 9 will now be described with respect to a hard drive. As indicated above, a sector descriptor data stream is a series of encoded bytes that keep track of the physical sectors reserved for a file to hold its data. The SD is coded in such a way that contiguous or non-contiguous sectors, and even sectors across soft partition boundaries, can be coded into the least amount of space as possible and avoids recording redundant information. The SD of FIGS. 8 and 9 includes bytes G, EC, C, CH, and SS. The EC, C, and CH bytes are combined to form a unique number pointing to a specific cylinder/head location on a drive.

A group byte (G) 802 sets the 512 GB boundary for the file and is particularly useful in very large capacity storage systems. This byte usually does not change in the SD data stream 800.

An extended cylinder byte (EC) 804 sets the upper eight bits of the cylinder/head characteristics that are currently pointed to by the SD.

A middle cylinder byte (C) 806 sets the middle eight bits of the cylinder/head characteristics that are currently pointed to by the SD.

A cylinder-head byte (CH) 808 sets the lower eight bits of the cylinder/head characteristics currently pointed to by the SD.

A sector start byte (SS) 810 sets the current starting sector in the cylinder/head location currently pointed to by the SD.

A sector count byte (SC) 812 sets the number of contiguous multiples of the MSC that the current location in the SD points to, if applicable.

Both SS 810 and SC 812 contain 2 bits that tell the decoder of the SD whether a sector count byte follows, or whether the CH 808, C 806, or EC 804 bytes have changed. The only time the CH, C, or EC bytes have to be included in subsequent runs of the SD is when their respective values have changed. For example, in SD 800, CH 814 follows SC 812 in the data stream. This is because the values for G 802, EC 804, and C 806 did not change during the processing of the data stream. This processing is described further in FIGS. 10 and 11.

Figure 10:
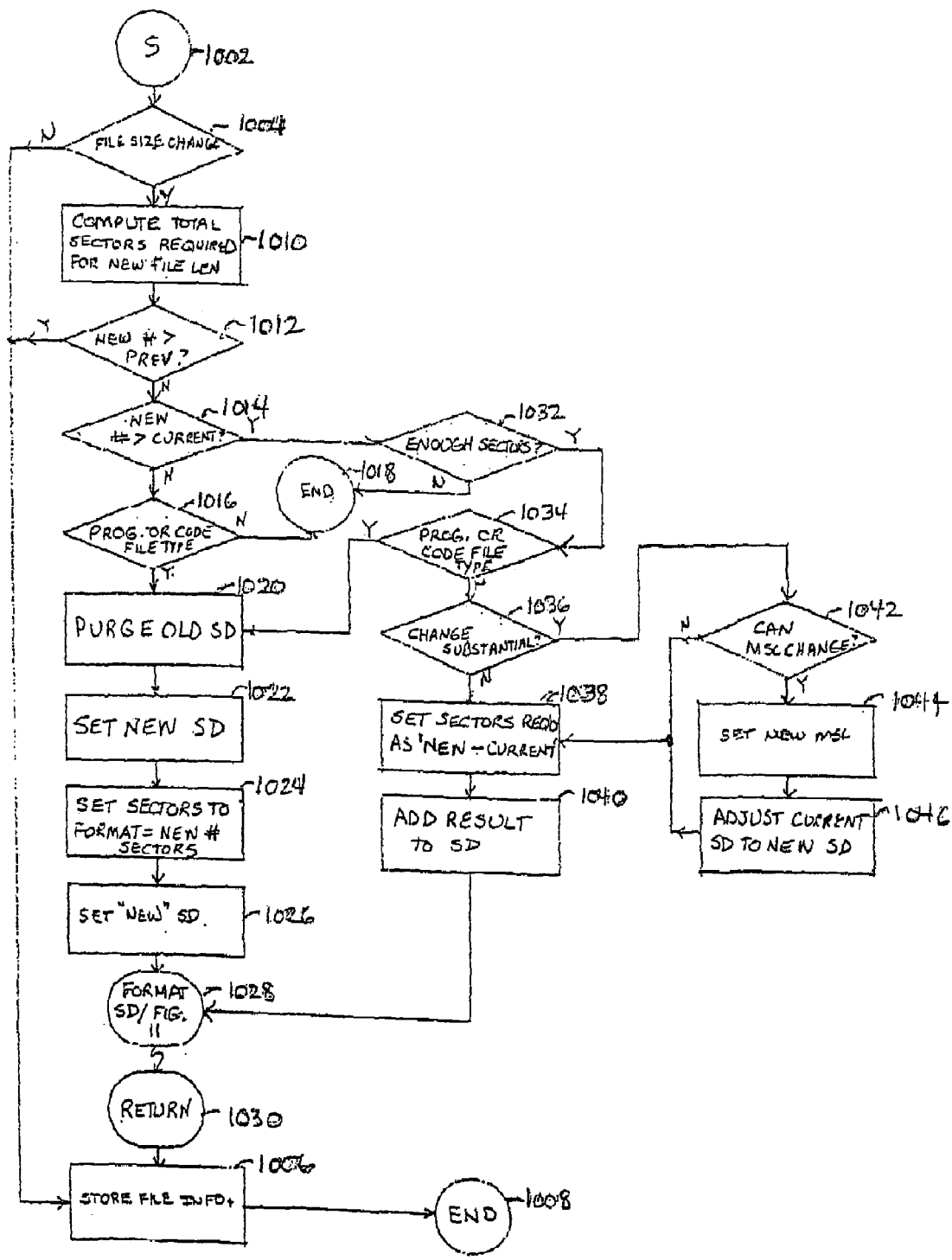
FIG. 10 is a flowchart illustrating how a sector descriptor data stream is rebuilt by the disk management tool in an exemplary embodiment.
Figure 11:
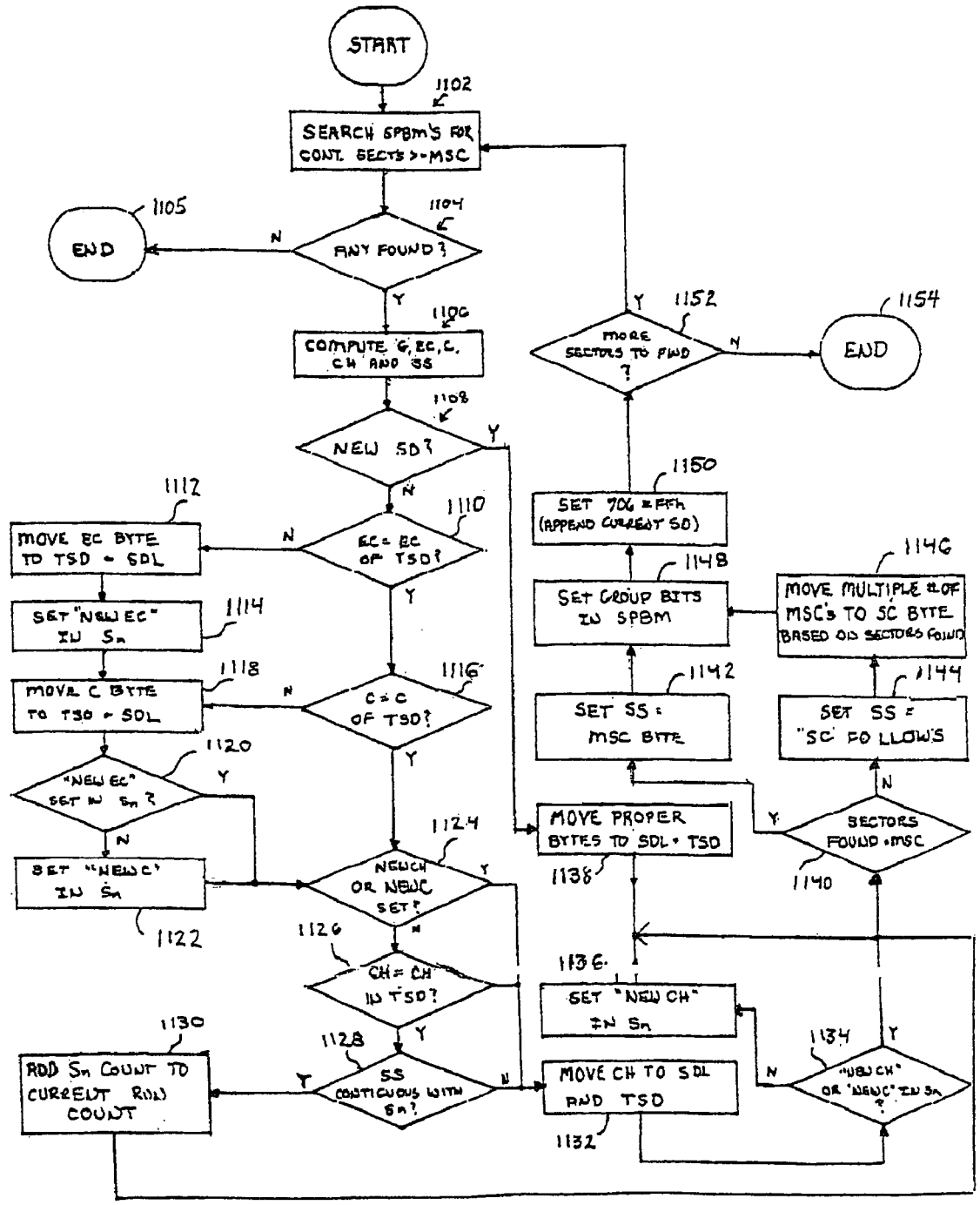
FIG. 11 is a flowchart illustrating how a sector descriptor data stream is built and modified by the disk management tool in an exemplary embodiment.

The MSC and the GC are used to build an SD for a file as described in FIGS. 10 and 11. If the SD is going to be an amended SD of a current file, the file's current SD is loaded into a scratch area located in computer memory, and the disk management tool starts to build the SD at the end of the current SD. However, if the tool finds that it can totally rebuild the entire SD in such a way as to compact the SD, it will do so. This may be done by quickly assessing the new size of the file and determining the number of new sectors it needs. It then searches the SPE which contains the majority of its current sectors. If there are enough, it will destroy the old SD and start computing a new one. Rebuilding an SD will now be described.

A user desiring to store a file begins the process at step 1002. The tool determines whether the file's size has changed since the last time it was stored at step 1004. If it hasn't, the file information is stored at step 1006 and the process ends at step 1008. If the size has changed, the tool computes the total number of sectors required for the new file length at step 1010. It then compares the result of step 1010 with the previously-established sector total at step 1012. If the new result is equal to the previously-established sector total, the file information is stored at step 1006 and the process ends at step 1008. If the new result is less than the previously established number, the tool then checks the file type at step 1016. If the file type is not a program or code file, the process ends at step 1018. If the file is a program or code file, the current SD is purged at step 1020, followed by setting the new MSC at step 1022. The tool sets the number of sectors to be formatted to equal the new number of sectors required at step 1024. A new SD is set at step 1026 and the flow proceeds to FIG. 11 which formats an SD at step 1028. Once the SD has been formatted, the process returns to FIG. 10 at step 1030 and the new file information is stored at step 1006 before the process ends at step 1008.

Reverting back to step 1014, if the new resulting number of sectors is greater than the previously-established sector total the tool then checks to see if there are enough sectors available on the drive to accommodate this new number at step 1032. If there aren't enough, the process ends at step 1018. If there are enough, the tool then determines the type of file being stored at step 1034. If the file is a program or code type file, the old SD is purged at step 1020 and the process recited in steps 1022–1030 are repeated. If the file is not a program or code type file, the tool checks to see if the change is sectors is substantial at step 1036. If not, the sectors required is set as 'new minus current number' at step 1038. The value resulting from step 1038 is added to the SD at step 1040. The process continues at step 1028. If the change in sectors is substantial the tool checks to see if the MSC is able to be changed at step 1042. If not, the process returns to step 1038. If so, the new MSC is set at step 1044 followed by adjusting the current SD to accommodate the new MSC at step 1046 and the process returns to step 1038.

The process of building and/or appending an SD will now be described. Before the tool can build or append an SD, one of two actions must have occurred. First, if the SD being formatted is a new SD then the new SD byte 706 of FIG. 7 in the TSD is set to zero and the sector descriptor location (SDL) is set to the beginning of the SD scratch area. The sector descriptor location, or offset, is a location in memory where the tool places the next formatted byte(s) for the SD it is building. Second, if the SD being formatted is being appended to a current SD, then the current SD is loaded into the SD scratch area. The tool then decodes the current SD in its entirety leaving the last decoded values of G, EC, C, and CH bytes in their respective locations in the TSD in block 704 of FIG. 7. The byte in the TSD in block 706 is set to FFh to indicate an appended SD is to be built. The SDL is positioned at the end of the current SD.

Referring now to FIG. 11, the tool searches the SPBMs for continuous groups of sectors whose counts are greater than or equal to the desired MSC supplied to the tool. The tool may search all of the SPBMs as necessary in order to find the group(s) it needs. If, at step 1104, the end of the SPBM search is reached and no acceptable group(s) are found, the process ends, and an error condition is set to signify that there are not enough sectors available for the file in step 1105. If a group, or groups, are found, the process continues at step 1106 where the values of the G, EC, C, CH, and SS bytes are computed based upon where the first free group in the current run was found.

If, at step 1108, the tool finds that the SD is a new SD (i.e., the byte 706 is 00), the process jumps to step 1138 which moves the bytes to the SDL and the TSD and the process continues at step 1140. For a new SD, the first values in the TSD are also the values in the SDL so no further checking is necessary. For an appended SD, however, the coding process begins at step 1110. The G byte does not change. The EC byte is compared with the EC byte held in the TSD. If it is the same, the process jumps to 1116. If it is different, the new EC value is placed in the TSD and the SDL at step 1112. It will be understood that the SDL is incremented as necessary each time a value is sent to it. At step 1114, the previous Sn byte is set to signify that a new EC byte follows. The Sn byte can be either the SS byte or the SC byte of the preceding run, whichever is present.

At step 1116, the C byte is compared to the C byte held in the TSD. If they are equal, the process continues at step 1124. If the C byte is different, then the new value C is placed in the TSD and the SDL at step 1118. The tool then checks to see if the C byte was set due to an EC byte change, or if it was due to a C byte change at step 1120. If due to an EC change, the process continues at step 1124, otherwise the Sn byte is set to indicate a new C byte follows at step 1122.

At step 1124, the Sn byte is checked to see if the newEC or newC condition is present. If it is, then the process continues on to step 1132. If not, the tool checks to see if the computed CH is equal to the CH in the TSD at step 1126. If it is not, the process again continues at step 1132. If it is, the tool checks to see if the computed SS is contiguous to the Sn byte at step 1128. If it is not, the process once again continues with step 1132. If the SS is contiguous, however, the previous Sn is added to the value of the found sectors of the current run at step 1130 and the process continues at step 1140.

At step 1132, the new CH byte is moved to the TSD and the SDL. If at 1134 a newEC or newC condition is detected, the process flow proceeds to step 1140, otherwise the Sn is set to the new CH condition at step 1136.

At step 1140, the tool checks to see if the number of sectors in the new grouping is equal to the MSC. If it is, then the SS byte is moved to the SDL and becomes the new Sn byte, and is set to MSC condition at step 1142. If it is not equal to the MSC then the grouping must be greater than the MSC and flow continues to step 1144. Here the SS byte is moved to the SDL and is set to the 'SC byte follows' condition. At step 1146, the multiple number of MSCs derived from the grouping count computed is moved to the SDL. The previous condition of the SS is now imposed upon the SC and the SC now becomes the Sn byte.

The flow continues to step 1148 from steps 1142 and 1146 where the bits corresponding to the groups just detected are set, (i.e., their corresponding sectors are now taken). At step 1150, byte 706 is set to FFh to signify that subsequent formatting in this run must be "appending", and the tool checks to see if more sectors are needed for the file at step 1152. If more are needed, the process repeats at step 1102. If not, the process ends at step 1153.

Figure 12:
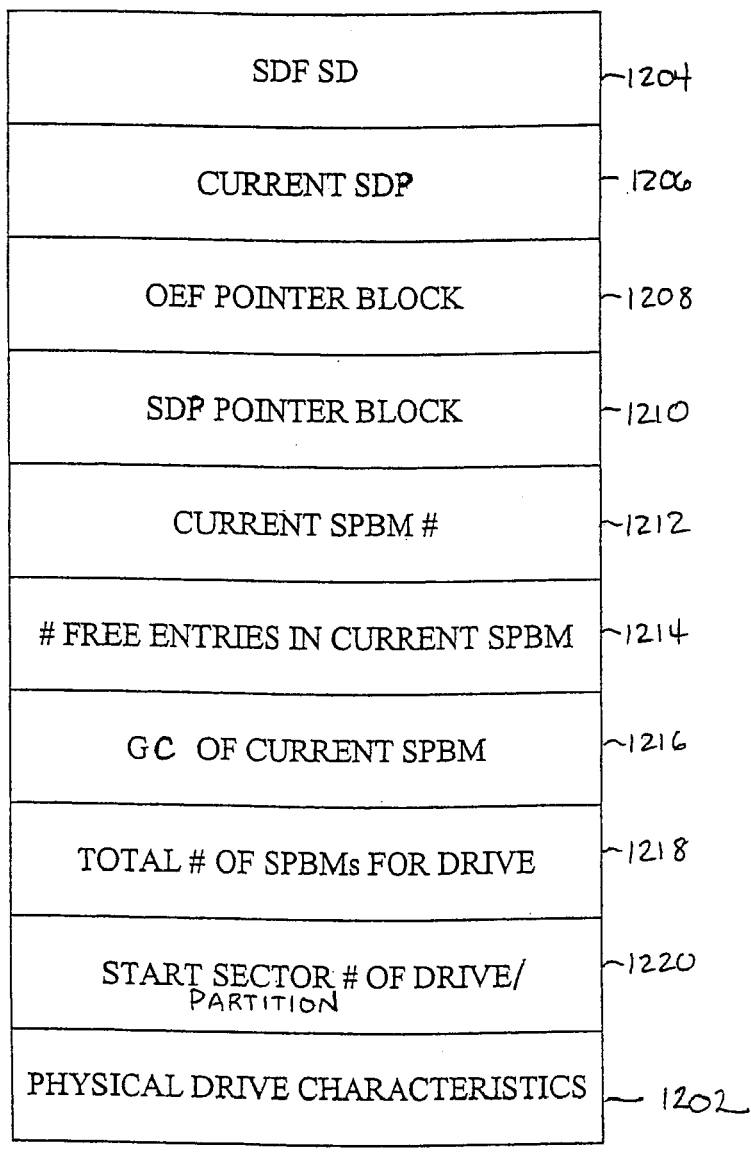
FIG. 12 is a disk descriptor table utilized by the disk management utility.

Referring now to FIG. 12, a data descriptor table will now be described. The number of DDT tables required by the tool depends on the number of drives that need to be accessed for a computer system. One DDT is created for each drive, unlike the CFP/CFSD table described earlier in which only a single table is needed irrespective of the number of drives on the computer system.

The disk descriptor table (DDT) 1202 describes and points to sectors for the associated drive in an orderly manner. The DDT holds relevant information about the drive that is needed by files in order to access sectors for a corresponding drive. The DDT is responsible for handling the SPEs, SPBMs, OEFs, and the SDFs. It also sets aside the scratch area referred to above for drive functions and manages the locations in memory where data will be transferred to and from the disk drive.

Referring now to DDT table 1200, the characteristics of the drive as determined in step 108 of FIG. 1 are stored in entry 1202. As the SDF is a file itself, it needs an SD. The location of the SD on the drive for this SDF is pointed to by the contents of this entry. The SD of the SDF can become large and therefore its SD is broken into smaller parts or sector descriptor portions (SDPs). Entry 1206 points to the current SDP residing in the DDT area. The OEF is treated as a random data file and this entry 1208 points to the current record number loaded into the DDT area. Entry 1210 stores the number of the SDP contained in entry 1206. The SDP is found in the SD for the SDF based on this number. The value stored in 1212 is arrived at by computation and points to an entry, or SPE of FIG. 2. Entry 1214 stores remaining entries left from column 202 of FIG. 2. Entry 1216 stores the GC associated with the SPE entry of FIG. 2. The value stored in 1218 is computed on initialization (e.g., 52 entries). If a drive is hard partitioned, the start sector number of the partition will be at an offset from the first sector. This is important for computing the physical location of a sector for a file stored in the partition.

The disk management tool greatly enhances the managing, storing, and reading/writing of computer system files, with improved speed. System resources are optimized for handling programs and data. The sector descriptor data stream component points directly to sectors on a drive, eliminating any intermediate structures typically required to access a file's sectors once the sector descriptor is formatted.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method for optimizing disk space and information access of a computer storage system, comprising:
   receiving formatting parameters for a hard partition of said computer storage system;
   formatting said hard partition into a plurality of soft partitions; and
   building system structures based upon said formatting parameters, said system structures comprising:
      a soft partition table and corresponding soft partition bit maps operable for specifying whether sectors on a disk are free or occupied, said soft partition table storing information for soft partitions;
      a sector descriptor file storing sector descriptors, said sector descriptors comprising a series of encoded bytes operable for tracking physical sectors reserved for a file to hold file data; and
      an offset entry file operable for specifying availability of storage blocks in said sector descriptor file.

2. The method of claim 1, further comprising:
   setting customizable sector allocations for a file; and
   setting conditions for sector allocation for a file.

3. The method of claim 1, wherein said formatting parameters include:
   at least one hard partition size;
   a drive name;
   a sector size;
   a sector descriptor storage block size; and
   a soft partition size.

4. The method of claim 1, wherein said formatting parameters are selectable by a user.

5. The method of claim 1, further comprising:
   periodically scanning said offset entry file for free entries;
   searching for sector descriptors capable of being moved from an end point of said sector descriptor file; and
   if found, moving said sector descriptors into said free entries.

6. The method of claim 1, wherein said sector descriptor file comprises a variable number of storage blocks dependent upon a number and size of sector descriptors occupying said sector descriptor file; and wherein further:
   each of said variable number of storage blocks are equal in size; and
   each bit in said offset entry file corresponds to a single storage block.

7. The method of claim 1, wherein sector descriptors of small size are stored in a file descriptor block, wherein a bit in said file descriptor block indicates whether said sector descriptor is stored internally or in said sector descriptor file.

8. The method of claim 1, wherein building a soft partition table further comprises:
   assigning a group count for each entry of said soft partition table as null operable for indicating a non-assignment;
   selectively indicating a read/write-protect for said each entry;
   providing a starting location of said each entry's soft partition bit map via a pointer column;
   establishing group counts of variable sizes to a first four entries in said soft partition table, if available, wherein each bit in said corresponding soft partition bit map refers to a single group count; and wherein further, said group counts indicate a number of contiguous sectors that each bit in said soft partition bit map represents;
   assigning group counts to remaining entries as needed; and
   reassigning new group counts to entries when all bits associated with an entry become zero.

9. The method of claim 8, wherein said group count refers to a flexible multiple of two assigned to said each entry.

10. The method of claim 1, wherein said sector descriptors comprise:
    at least one group byte operable for setting a 512-gigabyte boundary for a file;
    at least one extended cylinder byte operable for setting an upper eight bits of cylinder/head characteristics currently pointed to by a sector descriptor;
    at least one middle cylinder byte operable for setting a middle eight bits of said cylinder/head characteristics currently pointed to by a sector descriptor;
    at least one cylinder/head byte operable for setting a lower eight bits of cylinder/head characteristics currently pointed to by a sector descriptor; and
    at least one sector start byte operable for setting a current starting sector in a cylinder/head location currently pointed to by a sector descriptor, said sector start byte including two bits operable for determining which of three preceding bytes will change, if any, and whether a sector count byte follows;
    wherein said sector count byte sets a number of contiguous multiples of an MSC pointed to by a current location in a sector descriptor.

11. The method of claim 2, wherein said setting customizable sector allocations for a file further includes:
    assigning a minimum sector count (MSC) to a file, said MSC comprising a minimum number of contiguous sectors allocatable to a file;
    wherein said MSC is determined by file size and file type.

12. The method of claim 11, further comprising:
    assigning a new MSC in response to a substantial alteration of said file size, comprising:
       computing a number of sectors required for said altered file;
       comparing a number of sectors required for said file prior to alteration, with said number of sectors required for said altered file;
       purging a sector descriptor associated with said file;
       setting a new MSC;
       setting said number of sectors in accordance with said altered file;
       setting a new sector descriptor for said altered file;
       formatting said new sector descriptor; and
       storing new settings for said altered file.

13. The method of claim 12, wherein said formatting said new sector descriptor comprises:
    searching a soft partition bit map for continuous groups of sectors with counts capable of accommodating said MSC;
    searching alternative soft partition bit maps for continuous groups of sectors when said soft partition bit map is full;
    computing values of sector descriptor bytes in accordance with a first free group found; and
    moving said bytes to a sector descriptor location (SDL) and temporary sector descriptor (TSD), wherein said first values in said TSD are equivalent to said values in said SDL;
    wherein further said SDL refers to a location in memory where a next formatted byte for said sector descriptor is placed.

14. A storage medium encoded with machine-readable computer program code for optimizing disk space and information access of a computer storage system, the storage medium comprising instructions for causing a computer to implement a method comprising:

receiving formatting parameters for a hard partition of said computer storage system;

formatting said hard partition into a plurality of soft partitions; and building system structures based upon said formatting parameters, said system structures comprising:

a soft partition table and corresponding soft partition bit maps operable for specifying whether sectors on a disk are free or occupied, said soft partition table storing information for soft partitions;

a sector descriptor file storing sector descriptors, said sector descriptors comprising a series of encoded bytes operable for tracking physical sectors reserved for a file to hold file data; and an offset entry file operable for specifying availability of storage blocks in said sector descriptor file.

15. The storage medium of claim 14, further comprising instructions for causing said computer to implement a method comprising:

setting customizable sector allocations for a file; and
setting conditions for sector allocation for a file.

16. The storage medium of claim 14, wherein said formatting parameters include:

at least one hard partition size;
a drive name;
a sector size;
a sector descriptor storage block size; and
a soft partition size.

17. The storage medium of claim 14, wherein said formatting parameters are selectable by a user.

18. The storage medium of claim 14, further comprising instructions for causing said computer to implement a method comprising:

periodically scanning said offset entry file for free entries;
searching for sector descriptors capable of being moved from an end point of said sector descriptor file; and
if found, moving said sector descriptors into said free entries.

19. The storage medium of claim 14, wherein said sector descriptor file comprises a variable number of storage blocks dependent upon a number and size of sector descriptors occupying said sector descriptor file; and wherein further:

each of said variable number of storage blocks are equal in size; and
each bit in said offset entry file corresponds to a single storage block.

20. The storage medium of claim 14, wherein sector descriptors of small size are stored in a file descriptor block, wherein a bit in said file descriptor block indicates whether said sector descriptor is stored internally or in said sector descriptor file.

21. The storage medium of claim 14, wherein building a soft partition table further comprises instructions for causing said computer to implement a method comprising:

assigning a group count for each entry of said soft partition table as null operable for indicating a non-assignment;

selectively indicating a read/write-protect for said each entry;

providing a starting location of said each entry's soft partition bit map via a pointer column;

establishing group counts of variable sizes to a first four entries in said soft partition table, if available, wherein each bit in said corresponding soft partition bit map refers to a single group count; and wherein further, said group counts indicate a number of contiguous sectors that each bit in said soft partition bit map represents;

assigning group counts to remaining entries as needed; and reassigning new group counts to entries when all bits associated with an entry become zero.

22. The storage medium of claim 21, wherein said group count refers to a flexible multiple of two assigned to said each entry.

23. The storage medium of claim 14, wherein said sector descriptors comprise:

at least one group byte operable for setting a 512-gigabyte boundary for a file;

at least one extended cylinder byte operable for setting an upper eight bits of cylinder/head characteristics currently pointed to by a sector descriptor;

at least one middle cylinder byte operable for setting a middle eight bits of said cylinder/head characteristics currently pointed to by a sector descriptor;

at least one cylinder/head byte operable for setting a lower eight bits of cylinder/head characteristics currently pointed to by a sector descriptor; and at least one sector start byte operable for setting a current starting sector in a cylinder/head location currently pointed to by a sector descriptor, said sector start byte including two bits operable for determining which of three preceding bytes will change, if any, and whether a sector count byte follows; wherein said sector count byte sets a number of contiguous multiples of an MSC pointed to by a current location in a sector descriptor.

24. The storage medium of claim 15, wherein said setting customizable sector allocations for a file further includes instructions for causing said computer to implement a method comprising:

assigning a minimum sector count (MSC) to a file, said MSC comprising a minimum number of contiguous sectors allocatable to a file;

wherein said MSC is determined by file size and file type.

25. The storage medium of claim 24, further comprising instructions for causing said computer to implement a method comprising:

assigning a new MSC in response to a substantial alteration of said file size, comprising:

computing a number of sectors required for said altered file;

comparing a number of sectors required for said file prior to alteration, with said number of sectors required for said altered file;

purging a sector descriptor associated with said file;
setting a new MSC;
setting said number of sectors in accordance with said altered file;
setting a new sector descriptor for said altered file;
formatting said new sector descriptor; and
storing new settings for said altered file.

26. The storage medium of claim 25, wherein said formatting said new sector descriptor comprises instructions for causing said computer to implement a method comprising:

searching a soft partition bit map for continuous groups of sectors with counts capable of accommodating said MSC;

searching alternative soft partition bit maps for continuous groups of sectors when said soft partition bit map is full;

computing values of sector descriptor bytes in accordance with a first free group found; and moving said bytes to a sector descriptor location (SDL) and temporary sector descriptor (TSD); wherein said first values in said TSD are equivalent to said values in said SDL;

wherein further said SDL refers to a location in memory where a next formatted byte for said sector descriptor is placed.

27. A system for optimizing disk space and information access of a computer storage system via a disk management utility, comprising:
 a file initialization component performing a method comprising:
  receiving formatting parameters for a hard partition of said computer storage system;
  formatting said hard partition into a plurality of soft partitions; and
  building system structures based upon said formatting parameters, said system structures comprising:
   a soft partition table and corresponding soft partition bit maps operable for specifying whether sectors on a disk are free or occupied, said soft partition table storing information for soft partitions;
   a sector descriptor file storing sector descriptors, said sector descriptors comprising a series of encoded bytes operable for tracking physical sectors reserved for a file to hold file data; and
   an offset entry file operable for specifying availability of storage blocks in said sector descriptor file.

28. The system of claim 27, further comprising:
 a file allocation component, comprising:
  a sector descriptor data stream;
  a file descriptor block;
  a file pointer table and file/sector descriptor table; and
  a data management block;
   wherein said file allocation component performs a method, comprising:
    setting customizable sector allocations for a file; and
    setting conditions for sector allocation for a file.

29. The system of claim 28, wherein said sector descriptor data stream comprises:
 at least one group byte operable for setting a 512-gigabyte boundary for a file.

30. The system of claim 29, wherein said sector descriptor data stream further comprises:
 at least one extended cylinder byte operable for setting an upper eight bits of cylinder/head characteristics currently pointed to by a sector descriptor.

31. The system of claim 30, wherein said sector descriptor data stream further comprises:
 at least one middle cylinder byte operable for setting a middle eight bits of said cylinder/head characteristics currently pointed to by a sector descriptor.

32. The system of claim 31, wherein said sector descriptor data stream further comprises:
 at least one cylinder/head byte operable for setting a lower eight bits of cylinder/head characteristics currently pointed to by a sector descriptor.

33. The system of claim 32, wherein said sector descriptor data stream further comprises:
 at least one sector start byte operable for setting a current starting sector in a cylinder/head location currently pointed to by a sector descriptor, said sector start byte including two bits operable for determining which of three preceding bytes will change, if any, and whether a sector count byte follows; wherein said sector count byte sets a number of contiguous multiples of an MSC pointed to by a current location in a sector descriptor.

34. The system of claim 28, wherein said file descriptor block stores file entries of 64 bytes per entry.

* * * * *